US008585068B2

(12) United States Patent  (10) Patent No.: US 8,585,068 B2
Schlangen et al.  (45) Date of Patent: Nov. 19, 2013

(54) INDEPENDENT REAR SUSPENSION SYSTEM FOR AN ALL TERRAIN VEHICLE

(75) Inventors: Adam J. Schlangen, Rush City, MN (US); Jeffrey D. Bennett, Roseau, MN (US); Brian T. Utter, Greenbush, MN (US); Stephen L. Nelson, Osceola, MN (US); Louis J. Brady, Wyoming, MN (US)

(73) Assignee: Polaris Industries Inc., Medina, MN (US)

( * ) Notice: Subject to any disclaimer, the term of this patent is extended or adjusted under 35 U.S.C. 154(b) by 1064 days.

(21) Appl. No.: 11/543,430

(22) Filed: Oct. 5, 2006

(65) Prior Publication Data

US 2007/0176386 A1 Aug. 2, 2007

Related U.S. Application Data

(60) Provisional application No. 60/813,597, filed on Feb. 1, 2006.

(51) Int. Cl.
*B60G 3/04* (2006.01)
*B60K 17/00* (2006.01)

(52) U.S. Cl.
USPC ........ 280/124.134; 280/124.135; 280/86.751; 180/357

(58) Field of Classification Search
USPC ............. 280/86.751, 86.75, 86.757, 124.134, 280/124.135; 180/350, 357
See application file for complete search history.

(56) References Cited

U.S. PATENT DOCUMENTS

| | | | | | |
|---|---|---|---|---|---|
| 2,304,291 | A | * | 12/1942 | Wahlberg | 280/124.127 |
| 2,402,266 | A | * | 6/1946 | Williams | 180/24.11 |
| 2,605,118 | A | * | 7/1952 | Booth et al. | 280/86.756 |
| 2,684,253 | A | * | 7/1954 | Leighton | 280/86.751 |
| 3,218,827 | A | | 11/1965 | Aucktor | |
| 3,899,040 | A | * | 8/1975 | Figura | 180/217 |
| 4,143,887 | A | * | 3/1979 | Williams et al. | 280/124.106 |
| 4,300,651 | A | | 11/1981 | Krude | |
| 4,422,666 | A | * | 12/1983 | Proctor | 280/86.757 |
| 4,591,184 | A | * | 5/1986 | Matschinsky | 280/124.141 |

(Continued)

FOREIGN PATENT DOCUMENTS

| | | |
|---|---|---|
| DE | 19755307 | 12/1997 |
| JP | 63-90486 | * 4/1988 |
| JP | 7-186649 | * 7/1995 |
| WO | WO 2005/095142 | 10/2005 |

OTHER PUBLICATIONS

International Searching Authority/Stierman, Ernst, European Patent Office, International Search Report & Written Opinion PCT/US2006/048369, Aug. 16, 2007, 11 pages.

*Primary Examiner* — Paul N Dickson
*Assistant Examiner* — George Spisich
(74) *Attorney, Agent, or Firm* — Faegre Baker Daniels LLP

(57) ABSTRACT

An independent rear suspension for a vehicle having a chassis and a pair of rear wheels including a pair of IRS units. Each IRS unit includes an X-shaped lower control arm with a forward pivot connection to the chassis in front of the centerline of the driven sprocket and a rearward pivot connection behind the centerline, and a camber link connected to the chassis at a single pivot connection behind the centerline. Each IRS unit also includes a shock absorber coupled with an anti-sway bar to the lower control arm at a mount, and including a secondary spring in series with a main spring.

9 Claims, 11 Drawing Sheets

(56) References Cited

U.S. PATENT DOCUMENTS

| | | | |
|---|---|---|---|
| 4,709,935 A * | 12/1987 | Takizawa et al. | 180/414 |
| 4,754,992 A * | 7/1988 | Asanuma | 280/124.143 |
| 4,903,981 A * | 2/1990 | Alesso et al. | 280/86.757 |
| 4,973,075 A * | 11/1990 | Rori et al. | 280/86.757 |
| 5,007,154 A | 4/1991 | Kamata et al. | |
| 5,048,860 A * | 9/1991 | Kanai et al. | 280/86.757 |
| 5,074,578 A * | 12/1991 | Grove et al. | 280/86.753 |
| 5,094,472 A * | 3/1992 | Oyama et al. | 280/86.751 |
| 5,108,126 A * | 4/1992 | Banse | 280/86.757 |
| 5,251,713 A | 10/1993 | Enokimoto | |
| 5,507,510 A * | 4/1996 | Kami et al. | 280/124.136 |
| 5,725,453 A | 3/1998 | Zalewski et al. | |
| 5,775,719 A * | 7/1998 | Holden | 280/86.75 |
| 5,951,401 A | 9/1999 | Kita et al. | |
| 6,170,838 B1 * | 1/2001 | Laurent et al. | 280/5.508 |
| 6,267,387 B1 * | 7/2001 | Weiss | 280/5.52 |
| 6,267,388 B1 * | 7/2001 | Atkinson | 280/6.157 |
| 6,280,336 B1 | 8/2001 | Sone et al. | |
| 6,488,110 B2 * | 12/2002 | Price | 180/251 |
| 6,752,409 B1 * | 6/2004 | Kunert | 280/124.138 |
| 6,869,226 B2 | 3/2005 | Henkel et al. | |
| 7,152,866 B2 * | 12/2006 | Chalin et al. | 280/86.5 |
| 2002/0108799 A1 * | 8/2002 | Price | 180/251 |
| 2003/0236122 A1 | 12/2003 | Blumke et al. | |
| 2004/0011584 A1 | 1/2004 | Henkel et al. | |
| 2004/0195797 A1 | 10/2004 | Nash et al. | |
| 2005/0103553 A1 | 5/2005 | Korenjak et al. | |
| 2005/0173180 A1 | 8/2005 | Hypes et al. | |
| 2005/0275183 A1 * | 12/2005 | Amano | 280/124.128 |
| 2007/0001420 A1 * | 1/2007 | Schmidt et al. | 280/124.134 |

* cited by examiner

INDEPENDENT REAR SUSPENSION SYSTEM FOR AN ALL TERRAIN VEHICLE

RELATED APPLICATIONS

This application claims priority to U.S. Provisional Application Ser. No. 60/813,597, filed Feb. 1, 2006, the entire contents of which are hereby expressly incorporated herein by reference.

FIELD OF THE INVENTION

The present invention generally relates to all terrain vehicles (ATVs), and more particularly to an independent rear suspension system for an ATV.

BACKGROUND OF THE INVENTION

ATVs are popular multipurpose vehicles that are generally grouped into two categories: sport/high performance ATVs and utility ATVs. Sport ATVs are typically designed for high speed use, such as racing, and are thus lighter and faster than utility ATVs, which are used for activities such as hunting, camping and working. Sport ATVs are usually equipped with rear wheel drive and swing arm rear suspension, whereas utility ATVs are usually rear wheel drive with swing arm or independent rear suspension.

It is desirable to provide an ATV, particularly a high performance ATV, that is as light as possible, yet powerful and durable, with high quality ride characteristics. Many conventional ATVs provide some combination of power, durability and desirable ride characteristics, but often at the expense of added weight.

In ATVs having independent rear suspensions, the suspension system typically includes an upper control arm and a lower control arm, both of which generally include a mount in front of the drive axle centerline and a mount behind the drive axle centerline. In some designs, however, it is difficult to mount the upper control arm in front of the drive axle centerline because that space is occupied by other components.

For many high performance ATVs that employ independent rear suspensions, it is desirable to provide an anti-sway bar that effectively links the separate suspension units to one another for stability. As is known in the art, anti-sway (or anti-roll) bars provide a more level ride and inhibit the roll of the vehicle onto its suspension during cornering. Providing a mounting location for an anti-sway bar, however, adds additional weight, parts, and complexity to the vehicle. As such, it would be desirable to provide a lightweight, low part count, simple anti-sway bar for an ATV.

As is also known in the art, high performance ATVs, designed for improved handling and resistance to suspension bottoming, use higher ride frequencies than other ATVs designed for a smoother ride and slower maneuvering. Higher ride frequencies are a result of stiffer spring rate in the shock absorber springs. Such stiffer spring rates, however, may prevent the vehicle chassis from settling (or "riding in") as much as desired for peak performance and handling.

Additionally, when riding a sport ATV on oval type tracks or during flat track racing, the ATV is typically turned in one direction (or is primarily turned in one direction). Accordingly, the load on one of the IRS units is substantially different from the load on the other IRS unit. As such, it would be desirable to permit independent adjustment of the IRS units to "tune" the suspension system to the requirements of the track for enhanced handling.

SUMMARY OF THE INVENTION

The present invention provides an independent rear suspension for a high performance ATV that includes an upper control arm with a single mount located behind the drive axle centerline. In one embodiment of the invention, the lower control arm is substantially stiffened (using an X-shaped design) such that it supports most of the wheel loads. Thus, the upper control arm is needed only for camber support. As such, the upper control arm may be connected to the chassis using a single connection, which may be mounted behind the centerline of the drive axle (i.e., behind a vertical plane that passes through the center of the driven sprocket in an external chain driven configuration). Not only does the single mount of the upper control arm accommodate the positions of other components of the vehicle, its lightweight construction reduces overall vehicle weight.

The present invention further provides an anti-sway bar that is mounted using the shock mounts already provided on the lower control arms of the independent rear suspension.

Additionally, the present invention provides a shock design to provide high ride frequencies without sacrificing ride in characteristics. The design includes a small, soft spring in series with the main spring of the shock absorber. The small spring is designed for complete compression (or "stacking") under the weight of the vehicle. At full rebound, however, the small spring fills in what would be a gap in between the main spring and the spring retaining collar or adjustable preload collar, which retains a compression force in the system to reduce rattling of the springs and couplers.

The present independent rear suspension configuration also permits independent, side-to-side adjustment of spring preload, shock damping (both compression and rebound), and spring rate. The shocks include external adjusters (knobs or screws) that permit the rider to adjust compression and rebound damping of the shock. Additionally, the rider can adjust rear spring preload independently to improve cornering. The spring rates are adjusted by installing different springs, one with a higher spring rate than the other.

The features of the present invention described above, as well as additional features, will be readily apparent to those skilled in the art upon reference to the following description and the accompanying drawings.

DETAILED DESCRIPTION OF EMBODIMENTS OF THE INVENTION

The embodiments described below are merely exemplary and are not intended to limit the invention to the precise forms disclosed. Instead, the embodiments were selected for description to enable one of ordinary skill in the art to practice the invention. Additionally, while the vehicle of the following description is an ATV, it should be understood that the invention may have application to other types of vehicles such as dune buggies and other off-road vehicles.

Figure 1:
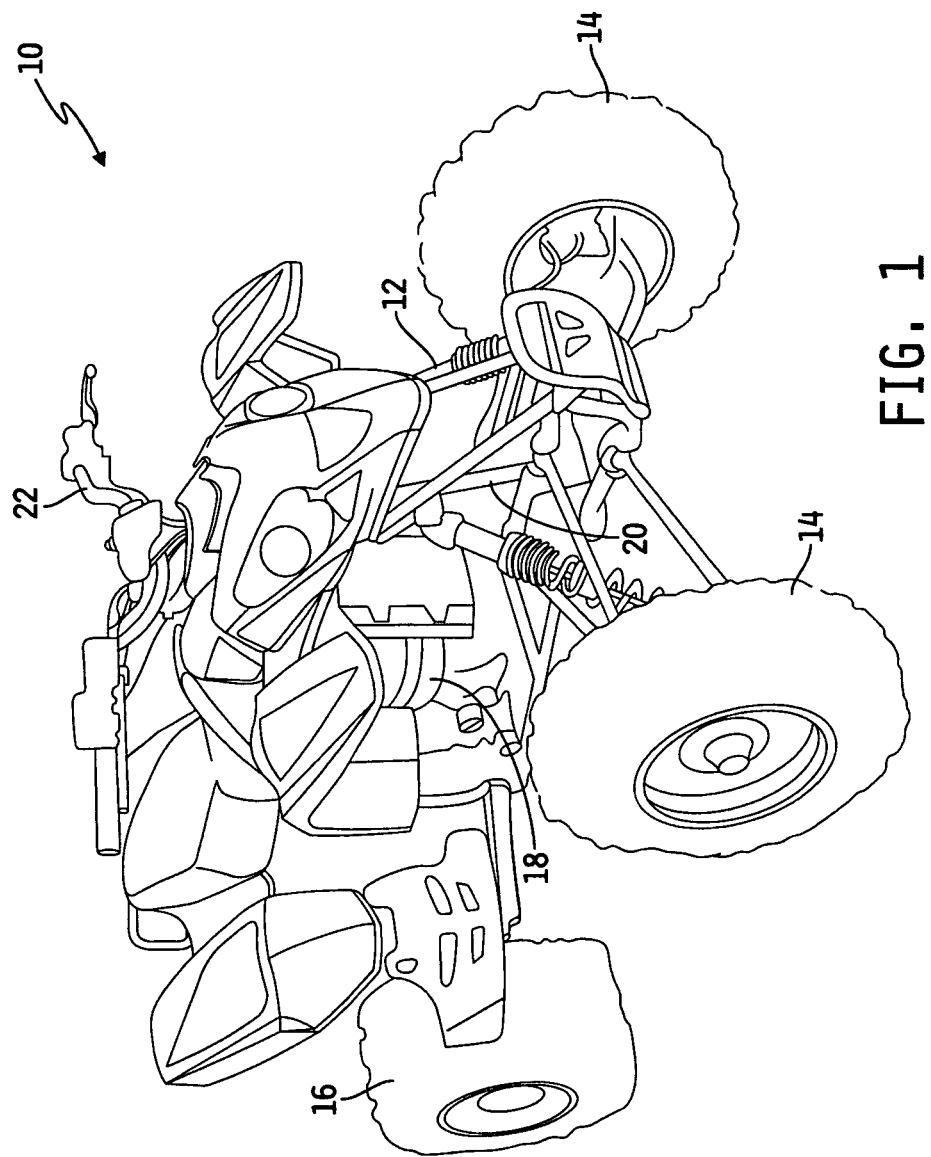
FIG. 1 is a perspective view of an ATV.

Referring now to FIG. 1, an ATV 10 according to the present invention is shown as including a variety of features, some of which are described in greater detail in the co-pending patent application entitled "REAR DRIVE AND SUSPENSION SYSTEM FOR AN ALL TERRAIN VEHICLE," filed on (INSERT DATE), the entire disclosure of which is hereby expressly incorporated herein by reference. ATV 10 generally includes a chassis 12, two front wheels 14, two rear wheels 16, an engine 18 supported on chassis 12 for providing power to rear wheels 16, a steering post 20 operatively connected to front wheels 14, and a steering control 22 (e.g., handle bars) coupled to steering post 20 for rotating steering post 20 to effect steering of ATV 10. It should be understood that while a particular configuration of chassis 20 is shown in the figures described below, any of a variety of different configurations may be used to support the various components of ATV 10. For example, many of the various support elements may have shapes and sizes that are different from those shown while still employing the teachings of the present invention.

Engine 18 may be any propulsion device suitable for propelling ATV 10, such as a 2-cycle or 4-cycle reciprocating internal combustion engine. Generally, such engines transfer energy from reciprocating pistons to a rotating crankshaft, which in turn drives a transmission. For purposes of the present invention, any transmission, such as a manual geared transmission or a continuously variable transmission, may be used. In the embodiments depicted and described below, the engine and transmission are a single unit.

Figure 2:
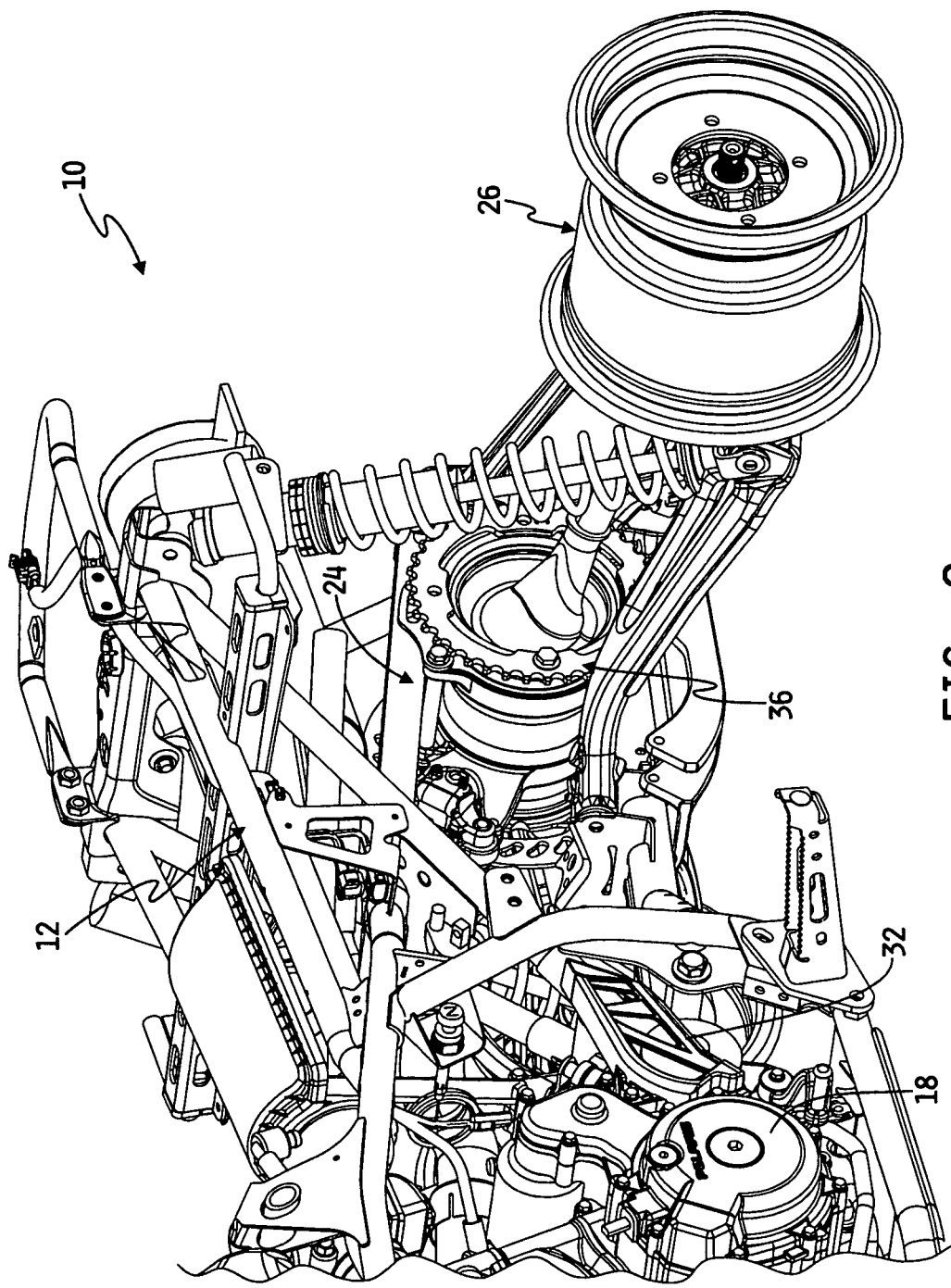
FIG. 2 is a perspective view of a partially disassembled ATV embodying features of the present invention.
Figure 3:
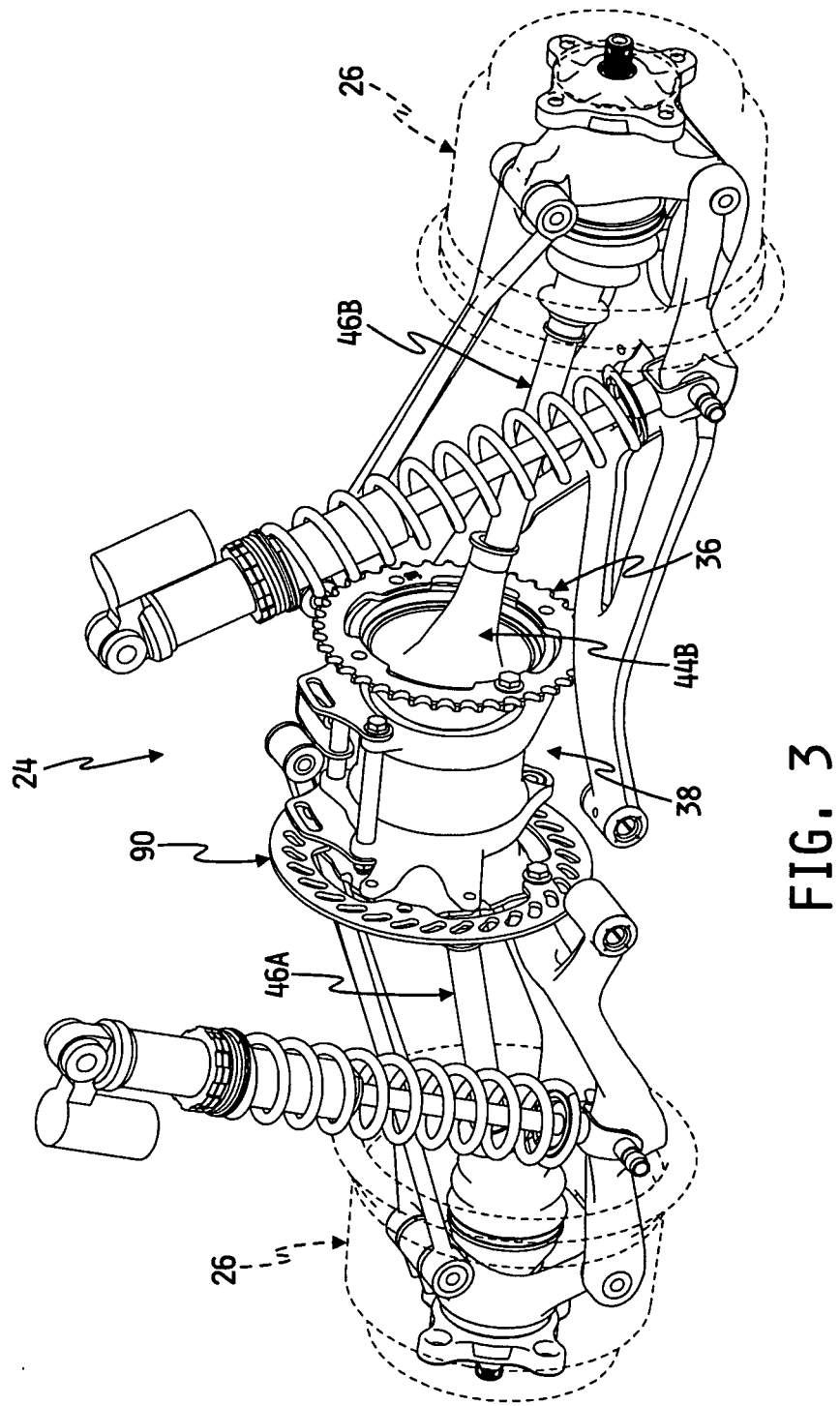
FIG. 3 is a perspective view of a drive mechanism and independent rear suspension according to the present invention.
Figure 4:
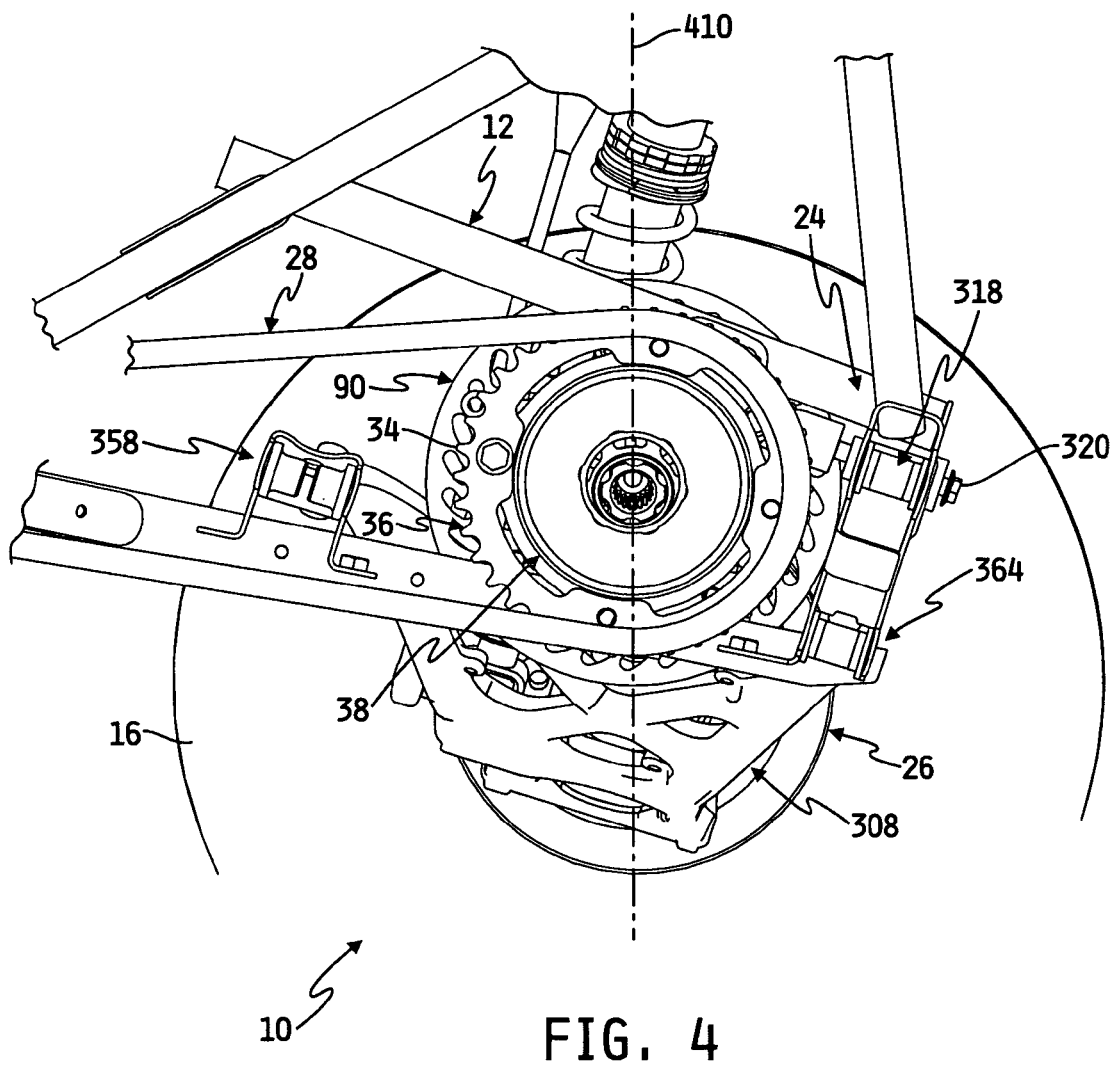
FIG. 4 is a partially fragmented, side elevational view of portions of the drive mechanism and independent rear suspension of FIG. 3.

Referring now to FIGS. 2 through 4, in one embodiment of the invention, energy is transferred from engine 18 to a drive mechanism 24 configured to cause rotation of rear wheel rims 26, which of course causes rotation of rear wheels 16. In this embodiment, an external chain 28 (FIG. 4) transfers energy from engine 18 to drive mechanism 24. More specifically, chain 28 includes a plurality of links coupled together to form a single loop. The links of chain 28 mesh with the teeth (not shown) of a drive sprocket 32 connected to the output drive shaft of the transmission, and with teeth 34 of a driven sprocket 36 coupled to drive mechanism 24 as is further described below. As should be understood from the foregoing, as engine 18 causes rotation of drive sprocket 32, chain 28 transfers energy to driven sprocket 36, the rotational energy of which is transferred to rear wheels 16 by drive mechanism 24. As compared to conventional internal chains and drive shafts, chain 28 is generally lighter and permits more efficient gearing changes.

In operation, engine 18 causes rotation of chain 28, which meshes with teeth 34 of driven sprocket 36, thereby causing rotation of driven sprocket 36. As driven sprocket 36 rotates, a sprocket hub (not shown) to which driven sprocket is connected rotates on bearings (not shown). A brake hub (not shown) and a rotor 90 connected to the brake hub also rotate as they are rigidly attached to the sprocket hub. As the sprocket hub rotates, an internal dual offset joint (not shown, but described in detail in the co-pending patent application referenced above) causes corresponding rotation of the half shafts 46A, 46B, extending between the sprocket hub and rear wheel rims 26. Rotation of half shafts 46A, 46B causes rotation of rear wheel rims 26, thereby propelling ATV 10 in a forward or reverse direction, depending upon the direction of rotation.

As indicated above, ATV 10 includes a rear independent suspension system (IRS) which permits rear wheels 16 to move vertically independent of one another while absorbing vibration and/or loading forces. One embodiment of IRS 300 is depicted in FIGS. 5 through 8. It should be noted that several components of IRS 300 are also shown in FIGS. 2 through 4, which also show drive mechanism 24. IRS 300 generally includes a pair of IRS units 302, 304 that are each movably coupled between chassis 12 and a rear wheel rim 26. As IRS units 302, 304 are mirror images of one another, only IRS 302 is described in detail herein.

Figure 6:
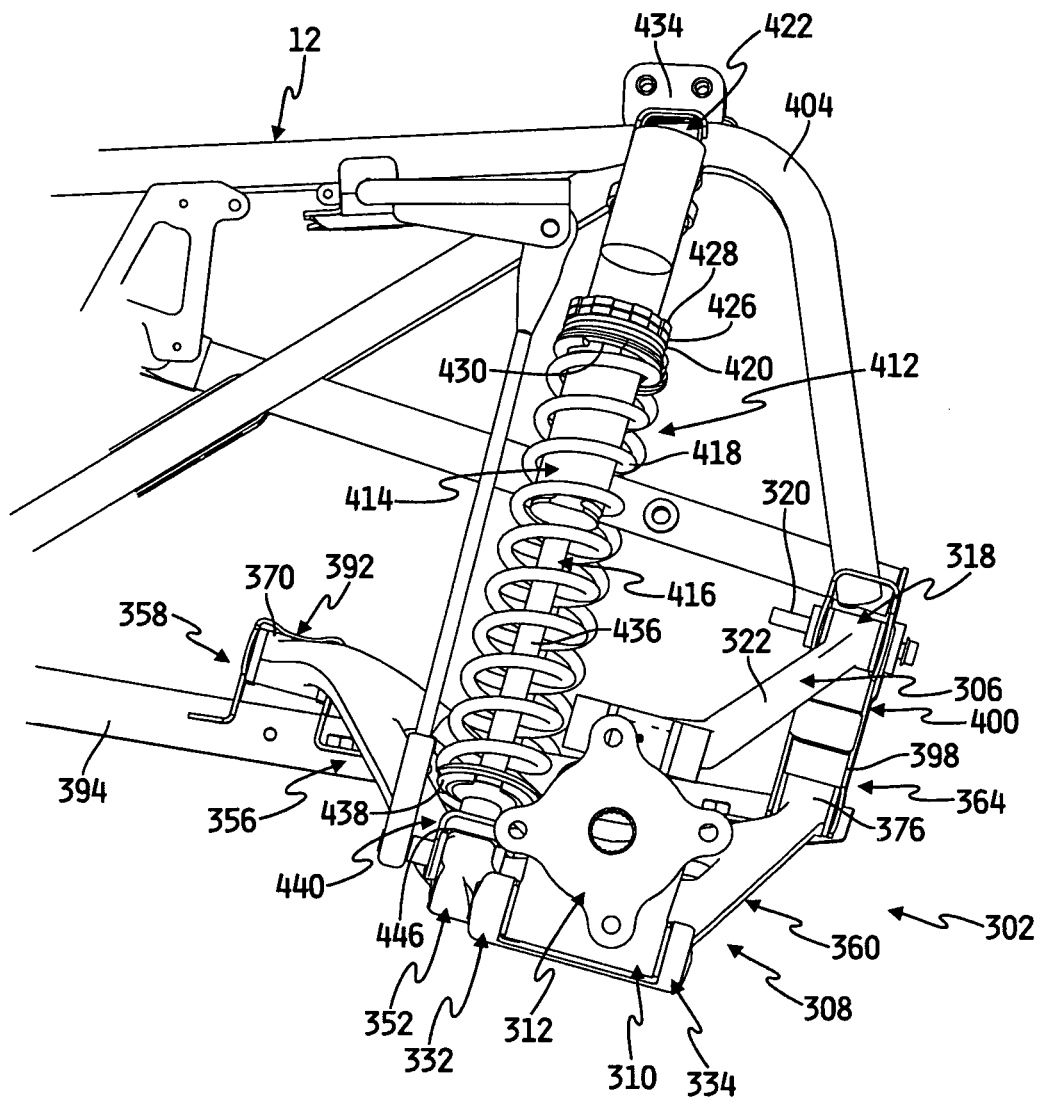
FIG. 6 is a side, elevational view of the suspension of FIG. 5.

IRS unit 302 includes an upper camber link 306, a lower control arm 308, a knuckle 310 connecting camber link 306 to control arm 308, and a wheel hub 312 attached to knuckle 310. Camber link 306 includes a first end 314 configured for pivotal coupling to knuckle 310 about a pin 316, and a second end 318 configured for pivotal coupling to chassis 12 about a pin 320 (FIG. 6). First end 314 includes a first portion 321 having an increased width relative to the elongated body portion 322 of camber link 306. First portion 321 includes a pair of cylindrical extensions 324, 326 having cylindrical openings 328 formed therethrough for receiving pin 316.

Figure 7:
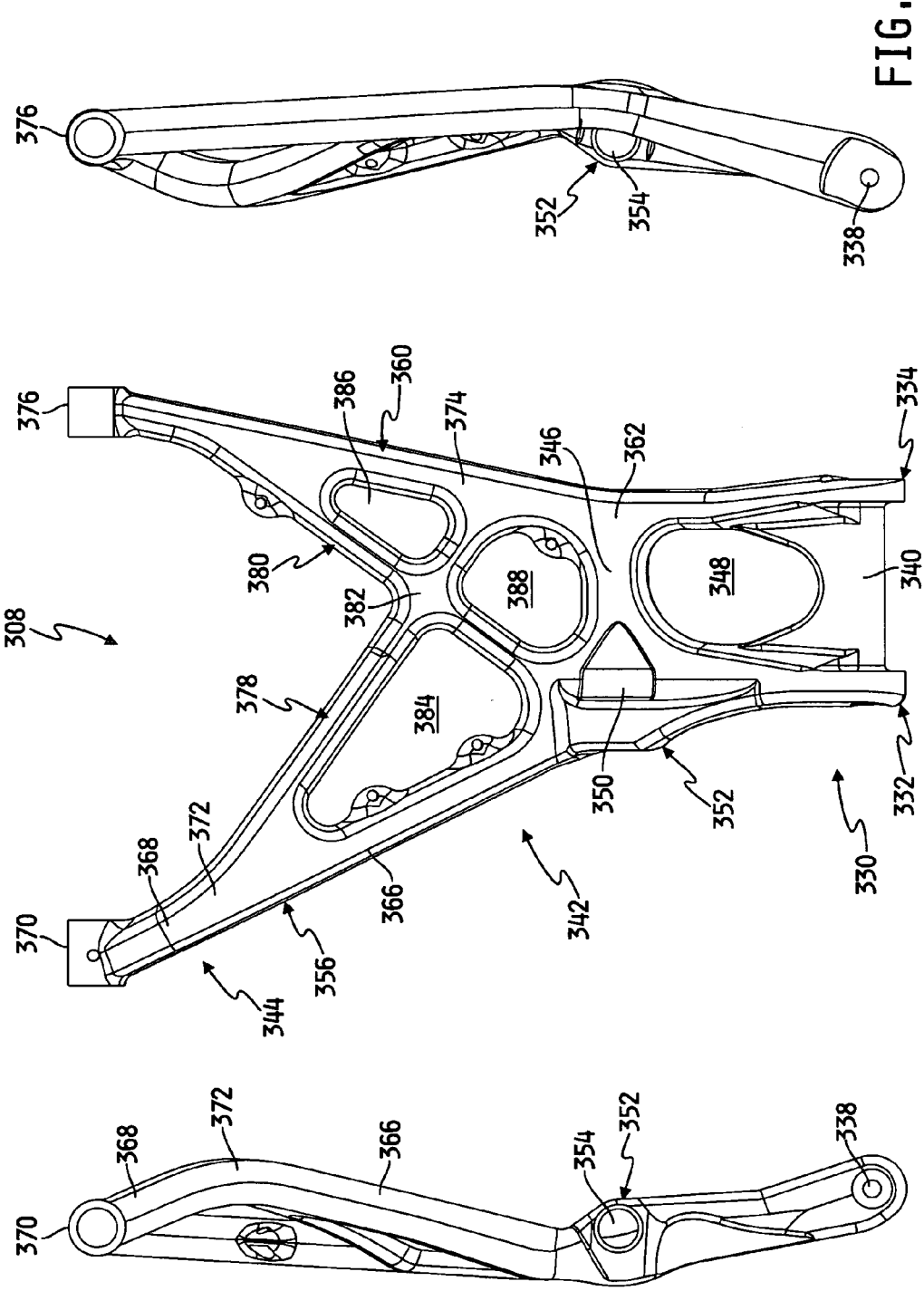
FIG. 7 is a combination side elevational and top plan view of a lower control arm component of the suspension of FIG. 5.

As best shown in FIG. 7, lower control arm 308 includes a first end 330 having a pair of supports 332, 334 configured to pivotally support knuckle 310 for partial rotation about a pin 336 extending through supports 332, 334 during travel. Supports 332, 334 include openings 338 for receiving pin 336. Supports 332, 334 are joined together by a web 340 for enhanced rigidity. Lower control arm 308 further includes a central body 342 and a second end 344. Central body 342 includes a central brace 346 extending substantially parallel to pin 316 and pin 336. Brace 346, web 340 and supports 332, 334, together define an outboard opening 348. Integral with brace 346 at end 350 adjacent support 332 is a mount 352 having an opening 354 extending therethrough. A shock absorber and an anti-sway bar link are connected to mount 352 as is described in detail below. A forward link 356 extends from end 350 of brace 346 toward a forward pivot connection 358 on chassis 12. A rearward link 360 extends from another end 362 of brace 346 toward a rearward pivot connection 364 on chassis 12. Forward link 356 includes an upwardly angled portion 366 extending from end 350 of brace 346, a downwardly angled portion 368 terminating at a cylindrical pivot end 370 for coupling to forward pivot connection 358, and an apex 372 connecting portion 366 and portion 368. (What structure is this shape avoiding? Draft a claim) Rearward link 360 includes a substantially linear body 374 extending between end 362 of brace 346 and a cylindrical pivot end 376 for coupling to rearward pivot connection 364.

Lower control arm 308 further includes a pair of cross links 378, 380 extending between forward link 356 and rearward link 360. Cross link 378 extends between apex 372 of forward link 356 and body 374 of rearward link 360 at a location adjacent brace 346, while cross link 380 extends between upwardly angled portion 366 of forward link 356 at a location adjacent mount 352 and body 372 of rearward link 360 at a location adjacent end 376. Cross links 378, 380 intersect at junction 382, thereby forming a substantially X-shaped interconnection between forward link 356 and rearward link 360. As such, cross links 378, 380 define a forward opening 384 with forward link 356, a rearward opening 386 with rearward link 360, and a central opening 388 with brace 346.

Figure 5:
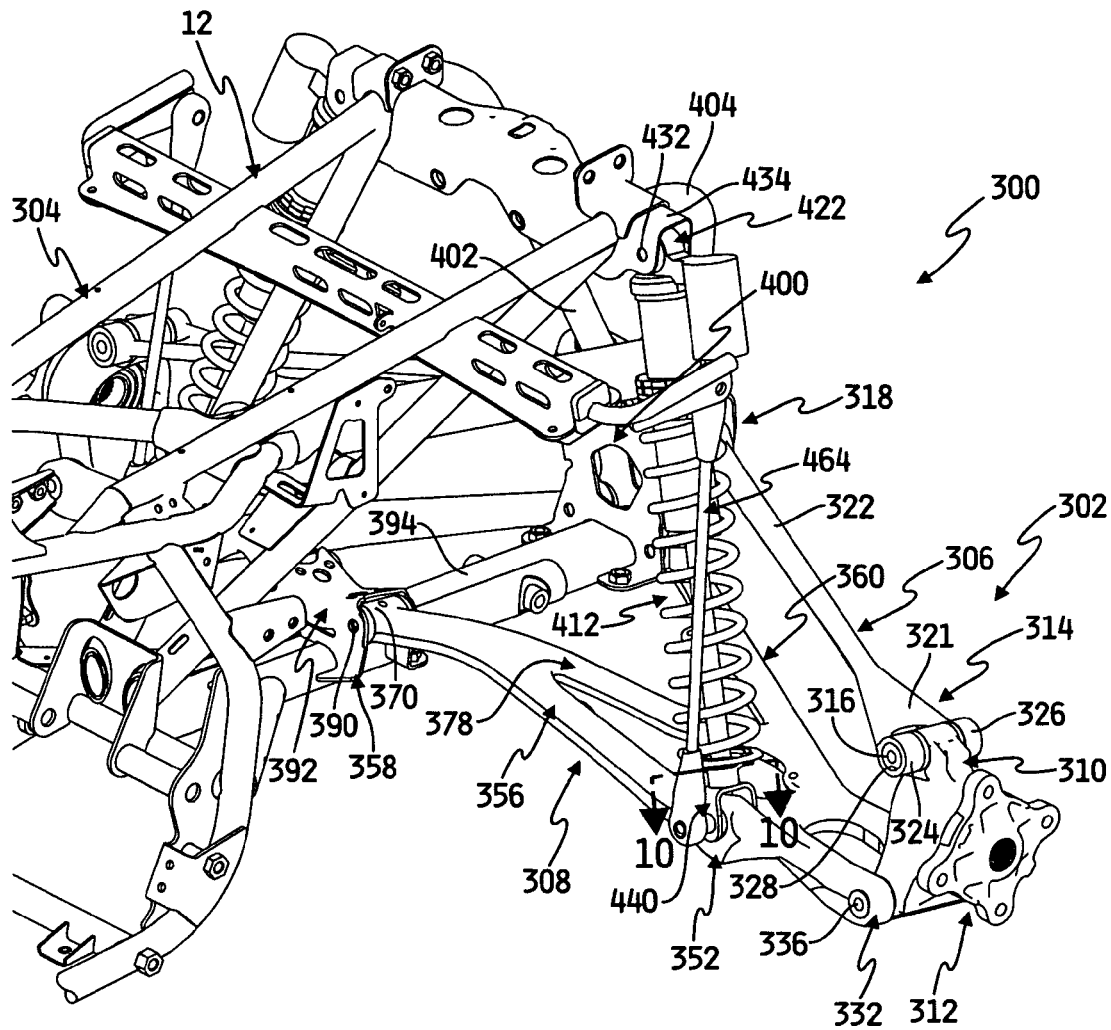
FIG. 5 is a partially fragmented, perspective view of an independent rear suspension according to principles of the present invention.
Figure 8:
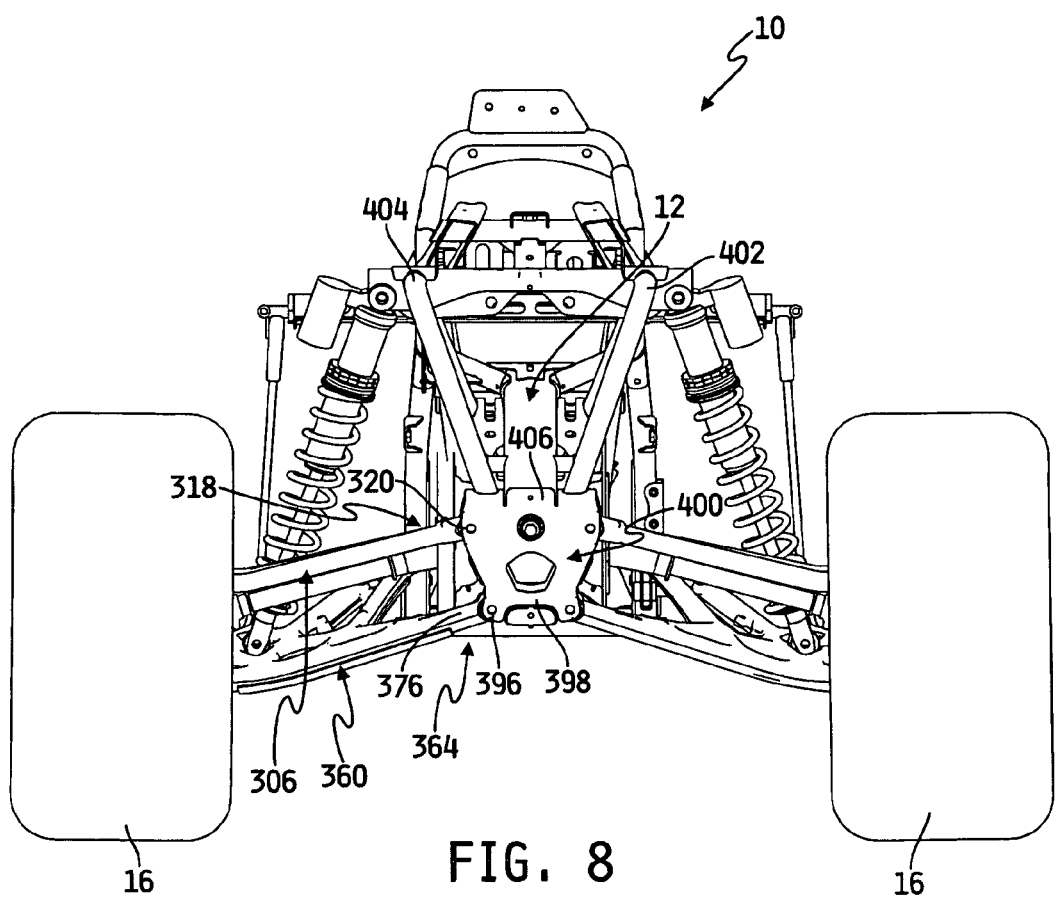
FIG. 8 is a rear, elevational view of the ATV of FIG. 1.

As best shown in FIGS. 5 and 6, cylindrical pivot end 370 of forward link 356 is attached by a pin 390 extending within a bracket 392 connected to a central lower member 394 of chassis 12. The corresponding forward link (not numbered) of IRS unit 304 also connects to bracket 392. Cylindrical pivot end 376 of rearward link 360 is attached by a pin 396 (FIG. 8) to a lower portion 398 of a rear suspension bracket 400 connected between central lower member 394 and a pair of angled uprights 402, 404 of chassis 12. Similarly, second end 318 of upper camber link 306 is attached by pin 320 to an upper portion 406 of rear suspension bracket 400. As best shown in FIGS. 6 and 8, lower control arm 308, in particular rearward link 360 is positioned in substantially parallel relationship to upper camber link 306. As should be apparent from the foregoing, as ATV 10 is driven, each of IRS units 302, 304 permits independent, substantially vertical travel of a rear wheel 16 relative to chassis 12.

It should be understood that the described configuration of ATV 10 provides enhanced riding characteristics relative to conventional ATVs. More specifically, by incorporating a dual offset joint into a sprocket hub instead of using separate CV joints spaced farther away from the ATV centerline, the present design permits the use of longer half shafts 46A, 46B while maintaining a conventional distance between rear wheels 16. Increased half shaft lengths can provide a decreased angle between the half shafts, which, when accompanied by correspondingly longer IRS units 302, 304, can result in increased travel and decreased lateral motion of rear wheels 16 during vertical travel (i.e., decreased "tire scrub").

As best shown in FIG. 4, forward pivot connection 358 and rearward pivot connection 364 are spread horizontally apart from one another. Moreover, forward pivot connection 358 is disposed in front of a vertical plane that passes through the center of driven sprocket 36 (hereinafter, "the sprocket centerline 410"), while rearward pivot connection 364 is disposed behind sprocket centerline 410. The positioning of forward pivot connection 358 and rearward pivot connection 364 relative to one another and relative to sprocket centerline 410 provides desirable load capacity for lower control arm 308, and decreases the half shaft angles mentioned above.

As should be apparent from the foregoing, unlike some independent rear suspension systems which include an upper and a lower control arm, each having a forward pivot connection in front of the sprocket centerline 410, IRS 300 does not include a forward pivot connection for upper camber link 306. As best shown in FIG. 4, the absence of a forward pivot connection for upper camber link 306 provides space for chain 28. To enable a single rearward pivot connection at end 318 of camber link 306, lower control arm 308 is substantially stiffened (by web 340, brace 346, cross links 378, 380, etc.) to support the majority of the loads encountered by rear wheels 16. The shape of the lower control 308 arm provides substantial torsional stiffness and supports longitudinal loads, lateral loads, vertical loads, and a portion of the overturning moment, the remainder of which is controlled by the upper camber link 306. As such, even under heavy loads, the lower control arm 308 is the only structure of IRS unit 302 that is needed to resist the deflection (or twisting) forces generated at rear wheel 16. The reduced load handling requirements on upper camber link 306 permit use of a relatively slender, single bar design for camber support alone (not for deflection control), with a single pivot connection at end 318 to chassis 12 at a location behind sprocket centerline 410. As is well known in the art, camber control is desirable because it improves the contact patch between the tires and the ground during cornering, when the vehicle places rolling or tilting force on the IRS. Upper camber link 306 is configured to keep the tires normal to the ground to the extent possible. Thus, camber link 306 accommodates the position of chain 28, performs the required camber control, and may be lighter than a conventional A-arm type upper control link.

Figure 9:
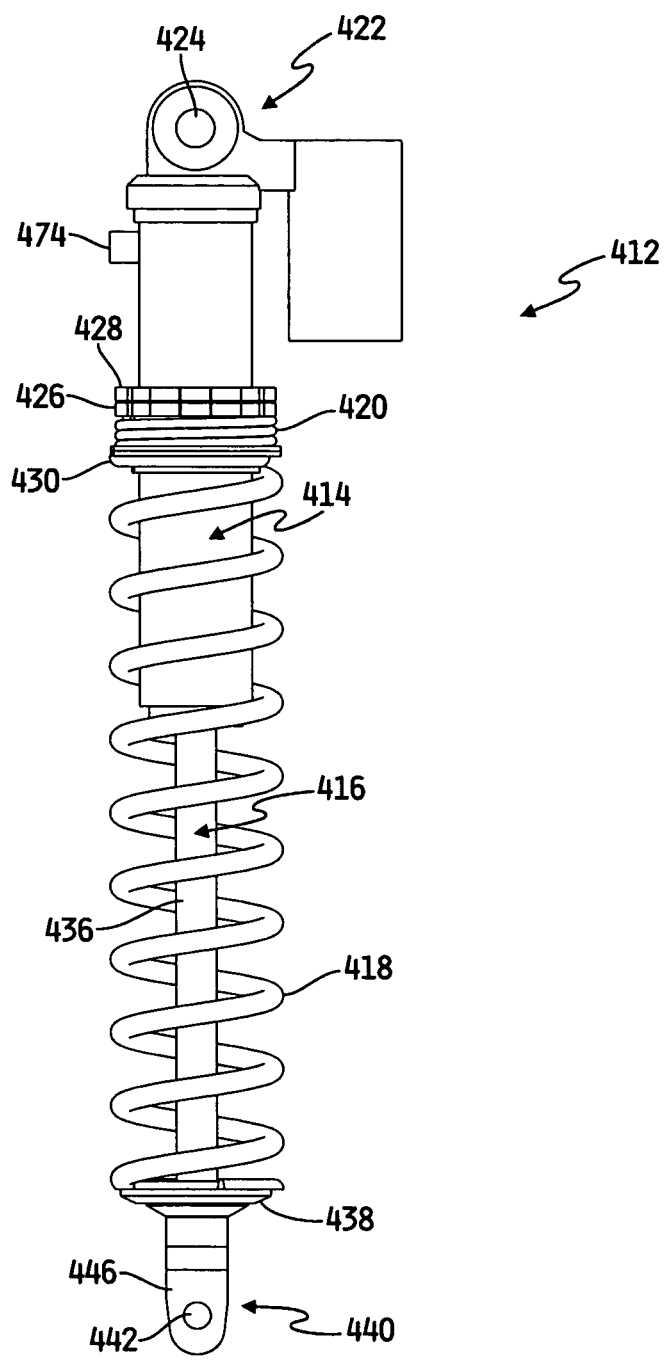
FIG. 9 is a side, elevational view of a shock absorber according to the present invention.

Referring now to FIGS. 6 and 9, each of IRS units 302, 304 includes a shock absorber 412. Shock absorber 412 generally includes a cylinder 414, a piston 416, a main spring 418, and a secondary or "ride in" spring 420. Cylinder 414 includes a mounting flange 422 at one end having an opening 424, a pair of adjustable preload rings 426, 428 disposed on outer threads (not shown) of cylinder 414, and an upper collar 430 that is movable longitudinally along the outer surface of cylinder 414. As shown in FIG. 5, a pin 432 extends through a shock mount 434 and opening 424 of mounting flange 422 to connect shock absorber 412 to chassis 12. Piston 416 extends into cylinder 414 to provide vibration damping in a manner that is well known to those skilled in the art. Piston 416 includes a rod 436, a lower collar 438 connected to rod 436, and a U-bracket 440 having a pair of aligned openings 442, 444 extending through side walls 446, 448 of U-bracket 440, respectively. As shown, main spring 418 coils around cylinder 414 and piston 416 and is compressed between upper collar 430 and lower collar 438. Secondary spring 420 coils around cylinder 414 and is compressed between preload ring 426 and upper collar 430.

Figure 10:
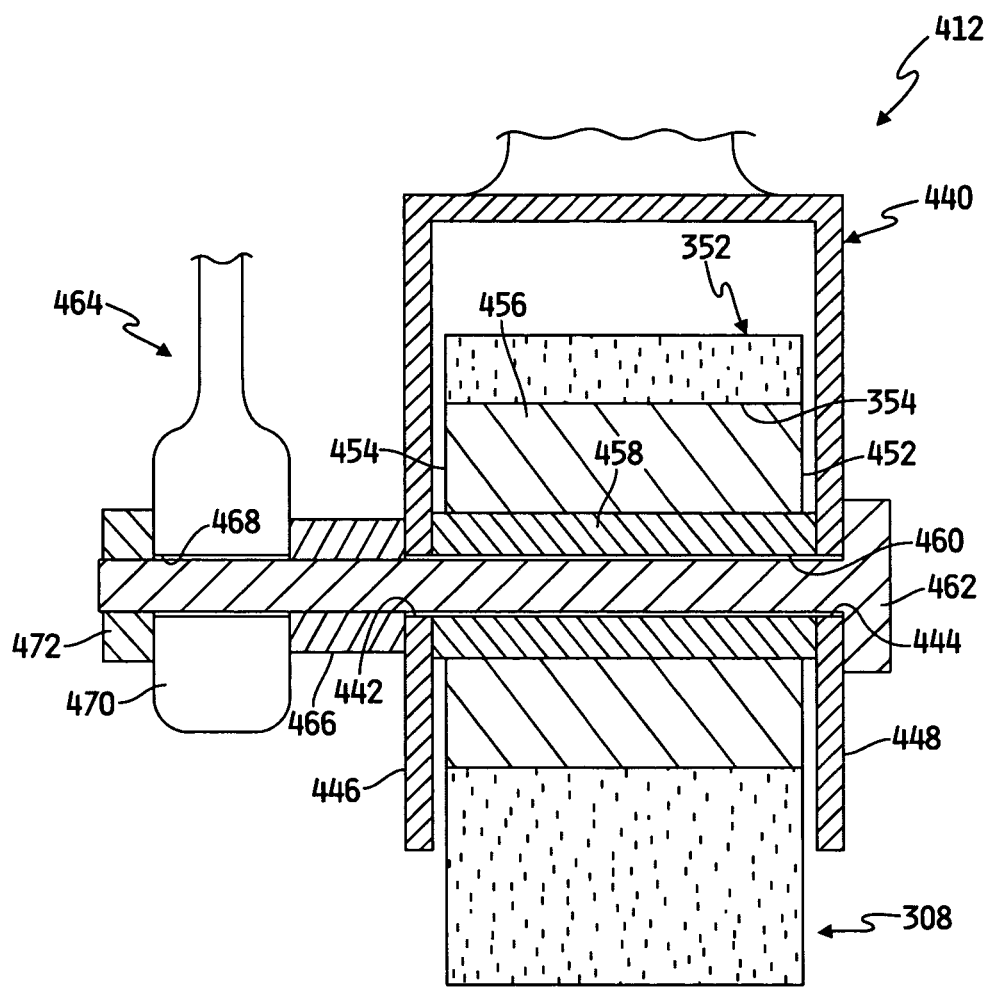
FIG. 10 is a partially fragmented, cross-sectional view taken along line 10-10 of FIG. 5.

As best shown in FIGS. 5 and 10, shock absorber 412 is mounted to lower control arm 308 at mount 352. More specifically, mount 352 includes opening 354 extending between side surfaces 452, 454. A cylindrical bushing 456 is fitted within opening 354, and a cylindrical sleeve 458 is fitted within bushing 456. Side walls 446, 448 of U-bracket 440 are positioned over mount 352 such that openings 442, 444 align with a bore 460 formed through sleeve 458. A fastener 462 is then passed through opening 444, bore 460, and opening 442. As should be apparent from the foregoing, as lower control arm 308 moves during travel of ATV 10, shock absorber 412 pivots about fastener 462 (i.e., sleeve 458 rotates within bushing 456).

As will be further described below, mount 352 serves the dual purpose of connecting shock absorber 412 to lower control arm 308 and connecting an anti-sway bar link 464 to lower control arm 308. More specifically, fastener 462 extends sufficiently beyond side wall 446 to receive a cylindrical spacer 466. Next, the through hole 468 of the lower end 470 of anti-sway bar link 464 is positioned over fastener 462. Finally, a nut 472 is threaded over fastener 462 to secure the connections between lower control arm 308 and shock absorber 412 and anti-sway bar link 464. By eliminating a separate connection between lower control arm 308 and anti-sway bar link 464, the present invention reduces weight and part count, and provides a simple anti-sway bar configuration for ATV 10.

Figure 11A:
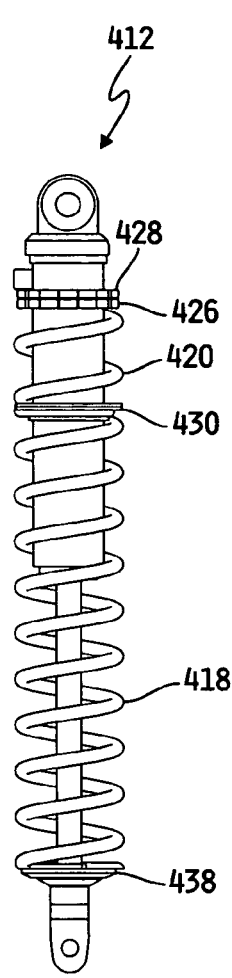
FIGS. 11(a)-(c) are side, elevational views of the shock absorber of FIG. 9 in various positions.
Figure 11B:
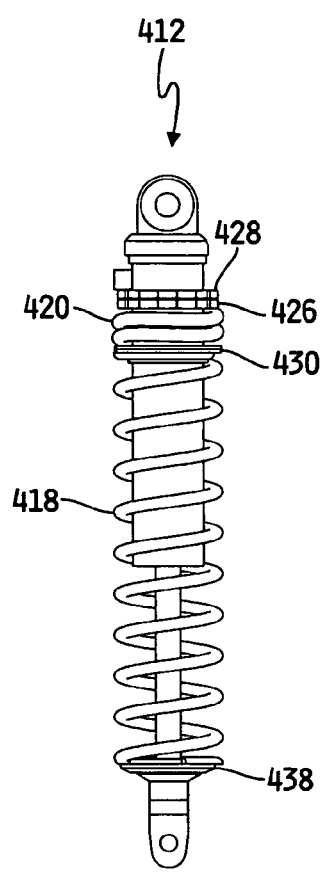

Referring now to FIG. 11B, shock absorber 412 is depicted at "ride height," (i.e., under partial compression under the weight of ATV 10). In this condition, main spring 418 is partially compressed between lower collar 438 and upper collar 430. It should be understood that for high performance ATVs, enhanced handling and high resistance to bottoming out the suspension system are desirable. Accordingly, high ride frequencies are desirable, which require stiffer spring rates for main spring 418. The increased stiffness of main spring 418, however, may prevent chassis 12 from settling (or "riding in") as much as desired for optimum performance. In other words, at full rebound when main spring 418 is fully extended (FIG. 11A), a gap may exist between main spring 418 and preload ring 426. Such a gap may result in increased vibration and noise as ATV 10 encounters rough terrain. Secondary spring 420 fills the gap between main spring 418 and preload ring 426.

Figure 11C:
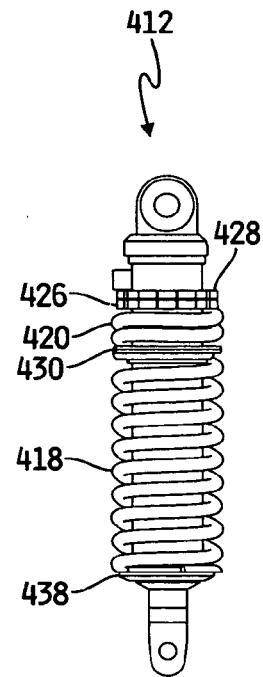

More specifically, secondary spring 420 is positioned in series with main spring 418, with upper collar 430 sandwiched between secondary spring 420 and main spring 418. As shown in FIG. 11B, at ride height secondary spring 420, which has a substantially lower spring rate than main spring 418, is fully compressed or stacked, and thus not contributing to the damping function of shock absorber 412. As shock absorber 412 becomes compressed to the full compression position shown in FIG. 11C, main spring 418 compresses between lower collar 438 and upper collar 430, while secondary spring 420 simply remains fully compressed between upper collar 438 and preload ring 426. However, as shock absorber 412 approaches the full rebound position of FIG. 11A, main spring 418 reaches full extension, but secondary spring 420, while partially extended, maintains some compression force against preload ring 426 and upper collar 430, thereby reducing the rattling associated with a high spring rate main spring 418. In one embodiment of the invention, main spring 418 has over six inches of travel, with a spring rate of 120 lbs/inch. Secondary spring 420 is configured to provide one inch of travel with a spring rate of 60 lbs/inch.

Under certain riding circumstances, such as when riding on an oval track or flat track racing, ATV 10 is primarily turned in one direction, thereby placing differing loads on IRS units 302, 304. In one embodiment of the present invention, the differing loads may be accommodated, thereby improving handling of ATV 10, by independently adjusting certain performance characteristics of shock absorbers 412. In particular, the preloading of each shock absorber 412 may be adjusted by rotating preload ring 426 on the external threads (not shown) of cylinder 414 to either increase or decrease the compression of main spring 418. Preload ring 428 is then rotated to engage preload ring 426, thereby locking preload ring 426 in the adjusted position. Additionally, each shock absorber 412 includes an external adjustment mechanism such as knob 474 (FIG. 9) which, when turned by the rider, adjusts the size of an orifice restriction through which oil flows from the working cylinder of the shock to a reservoir in response to displacement by the shock rod. In this conventional manner, the rider is able to adjust the compression and rebound damping provided by shock absorber 412. Finally, main spring 418 may be replaced with a spring having a different spring rate, thereby providing more or less resistance on one side of ATV 10 than on the other.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An independent rear suspension for a vehicle having a chassis and a pair of rear wheels, the suspension including:
   a first unit movably coupled between the chassis and one of the wheels; and
   a second unit movably coupled between the chassis and another of the wheels;
   the first and second units each include a lower control arm, a knuckle and a camber link and an upper portion of the knuckle has only one connection to the chassis which is provided by only the camber link, the camber links each being coupled to the chassis at only a single pivot connection
   and
   a rear supporting bracket supported by the chassis and having upper and lower mounting portions, the upper mounting portion being coupled to an inner end of the camber link, and the lower portion being coupled to a rear pivot connection of the lower control arm.

2. The independent rear suspension of claim 1, further comprising a drive sprocket for driving the wheels.

3. The independent rear suspension of claim 2, wherein each lower control arm is coupled to the chassis at two pivot connections.

4. The independent rear suspension of claim 3, wherein the pivot connections for each lower control arm flank the drive sprocket.

5. The independent rear suspension of claim 3, wherein the drive sprocket extends along a first longitudinal axis, and the pivot connections for each lower control arm are positioned between a vehicle centerline and the first longitudinal axis.

6. The independent rear suspension of claim 3, wherein the pivot connections for each lower control arm are positioned above a lowermost portion of the sprocket.

7. The suspension of claim 1, wherein the knuckle of each unit connecting the lower control arm and the camber link, the knuckle being configured for connection to a wheel hub.

8. The suspension of claim 7, wherein each camber link includes a first end configured for pivotal coupling to a corresponding knuckle about a first pin, and a second end configured for pivotal coupling to a corresponding single pivot connection about a second pin.

9. The suspension of claim 8, wherein each camber link further includes an elongated body portion extending between the first end and the second end.

\* \* \* \* \*